(12) United States Patent
Kodali et al.

(10) Patent No.: US 9,727,332 B2
(45) Date of Patent: Aug. 8, 2017

(54) INFORMATION TECHNOLOGY RESOURCE MANAGEMENT

(71) Applicant: International Business Machines Corporation, Armonk, NY (US)

(72) Inventors: Sreedhar B. Kodali, Bangalore (IN); Daniel N. Millwood, Southampton (GB); Sandeep Raghav, Fremont, CA (US); Srinivasa B. Vadlamudi, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 446 days.

(21) Appl. No.: 14/087,309

(22) Filed: Nov. 22, 2013

(65) Prior Publication Data
US 2015/0149608 A1    May 28, 2015

(51) Int. Cl.
| | | |
|---|---|---|
| *G06F 15/16* | (2006.01) | |
| *G06F 9/00* | (2006.01) | |
| *H04L 12/911* | (2013.01) | |
| *H04L 29/08* | (2006.01) | |
| *H04L 12/26* | (2006.01) | |
| *H04L 12/24* | (2006.01) | |

(52) U.S. Cl.
CPC ............ *G06F 9/00* (2013.01); *H04L 41/0816* (2013.01); *H04L 41/147* (2013.01); *H04L 43/08* (2013.01); *H04L 47/70* (2013.01); *H04L 67/10* (2013.01)

(58) Field of Classification Search
CPC ... H04L 41/17; H04L 41/147; H04L 41/0816; H04L 47/70; H04L 43/062; H04L 43/08; H04L 43/0876; H04L 67/10; G06F 2209/5019; G06F 17/30551; G06F 9/5011; G06F 9/00
USPC ...... 709/224, 226, 231; 718/1, 104; 717/120
See application file for complete search history.

(56) References Cited

U.S. PATENT DOCUMENTS

| | | | |
|---|---|---|---|
| 8,336,049 B2 | 12/2012 | Medovich | |
| 2008/0040321 A1* | 2/2008 | Baeza-Yates | ..... G06F 17/30551 |
| 2010/0088150 A1* | 4/2010 | Mazhar | ................. G06F 9/5088 |
| | | | 717/120 |
| 2011/0145392 A1 | 6/2011 | Dawson et al. | |

(Continued)

OTHER PUBLICATIONS

Sladescu et al., "Event Aware Elasticity Control for Cloug Application," School of Inforamtion Technologies, The University of Sydney, Australia, pp. 1-8, Apr. 2012.

(Continued)

*Primary Examiner* — Jungwon Chang
(74) *Attorney, Agent, or Firm* — Cantor Colburn LLP; Nicholas Bowman

(57) ABSTRACT

Embodiments relate to information technology resource management and scaling. According to one aspect, an upcoming event impacting an application operating on one or more resources is identified. A workload on the application is predicted based on the upcoming event identified and historical data about a previous event having similarity with the upcoming event. The prediction is performed using a predefined rule. A number of resources required to process the predicted workload is ascertained using a past scaling history of the application. The resources are scaled based on the ascertained number of said resources determined before the occurrence of the event.

10 Claims, 5 Drawing Sheets

(56) References Cited

U.S. PATENT DOCUMENTS

| | | | |
|---|---|---|---|
| 2011/0302578 A1* | 12/2011 | Isci | G06F 9/5077 718/1 |
| 2012/0079497 A1* | 3/2012 | Gangemi | G06F 9/5011 718/104 |
| 2012/0089726 A1 | 4/2012 | Doddavula | |
| 2012/0173709 A1 | 7/2012 | Li et al. | |
| 2012/0179822 A1 | 7/2012 | Grigsby et al. | |
| 2013/0042005 A1 | 2/2013 | Boss et al. | |
| 2013/0174149 A1* | 7/2013 | Dasgupta | G06F 9/5077 718/1 |
| 2013/0185433 A1* | 7/2013 | Zhu | H04L 67/303 709/226 |
| 2015/0113120 A1* | 4/2015 | Jacobson | G06N 5/04 709/224 |

OTHER PUBLICATIONS

Ghanbari et al., "Exploring Alternative Approaches to Implement an Elasticity Policy," Cloud Computing, 2011 IEEE International Conference, Jul. 2011, pp. 716-723.

* cited by examiner

INFORMATION TECHNOLOGY RESOURCE MANAGEMENT

BACKGROUND

The present disclosure relates generally to resource management, and more specifically, to information technology resource management and scaling.

Enterprise software systems have to provide high assurance in terms of Quality of Service (QoS) to the users. Failure to provide the required QoS results in decreased user base for the enterprise. Accordingly, enterprises maintain Service Level Agreements (SLAs) with the service provider for maintaining the QoS. This results in increased cost for the service provider as resources are to be allocated in such as manner so that the QoS is maintained.

SUMMARY

Embodiments include a system, a computer program product and a method for scaling resources. An upcoming event impacting an application operating on one or more resources is identified. A workload on the application is predicted based on the upcoming event identified and historical data about a previous event having similarity with the upcoming event. The prediction is performed using a predefined rule. A number of resources required to process the predicted workload is ascertained using a past scaling history of the application. The resources are scaled based on the ascertained number of said resources determined before the occurrence of the event.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

Through the more detailed description of some embodiments of the present invention in the accompanying drawings, the above and other objects, features and advantages of the present disclosure will become more apparent, wherein the same reference generally refers to the same components in the embodiments of the present invention.

DETAILED DESCRIPTION

Figure 1:
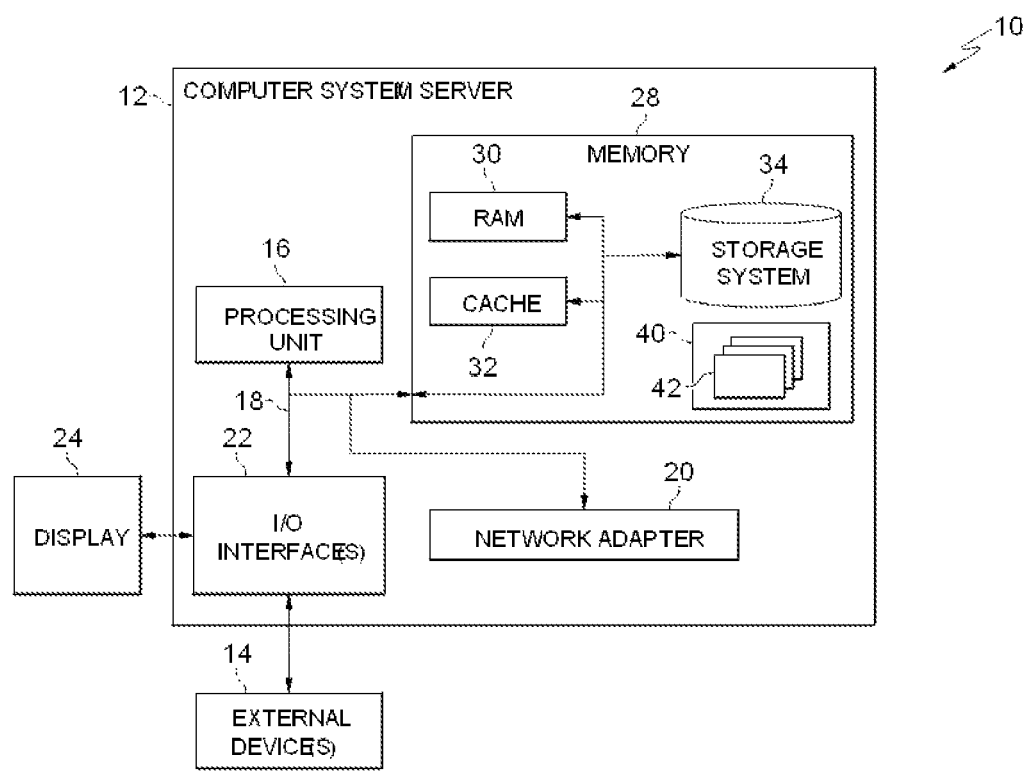
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
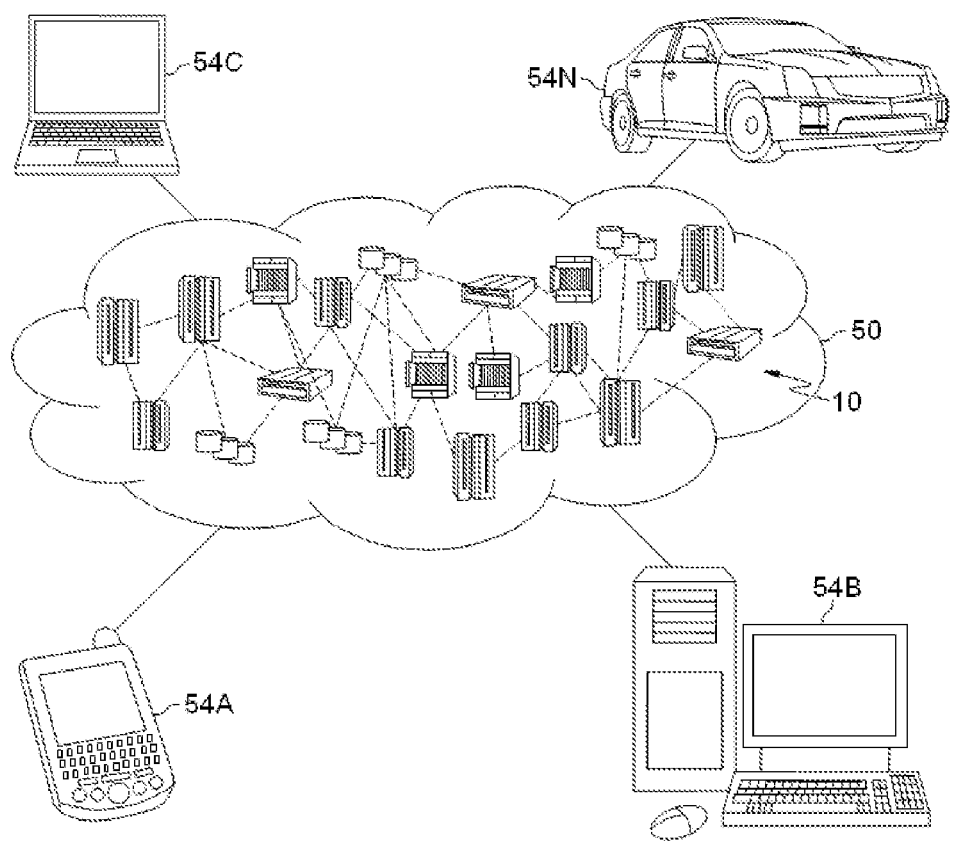
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
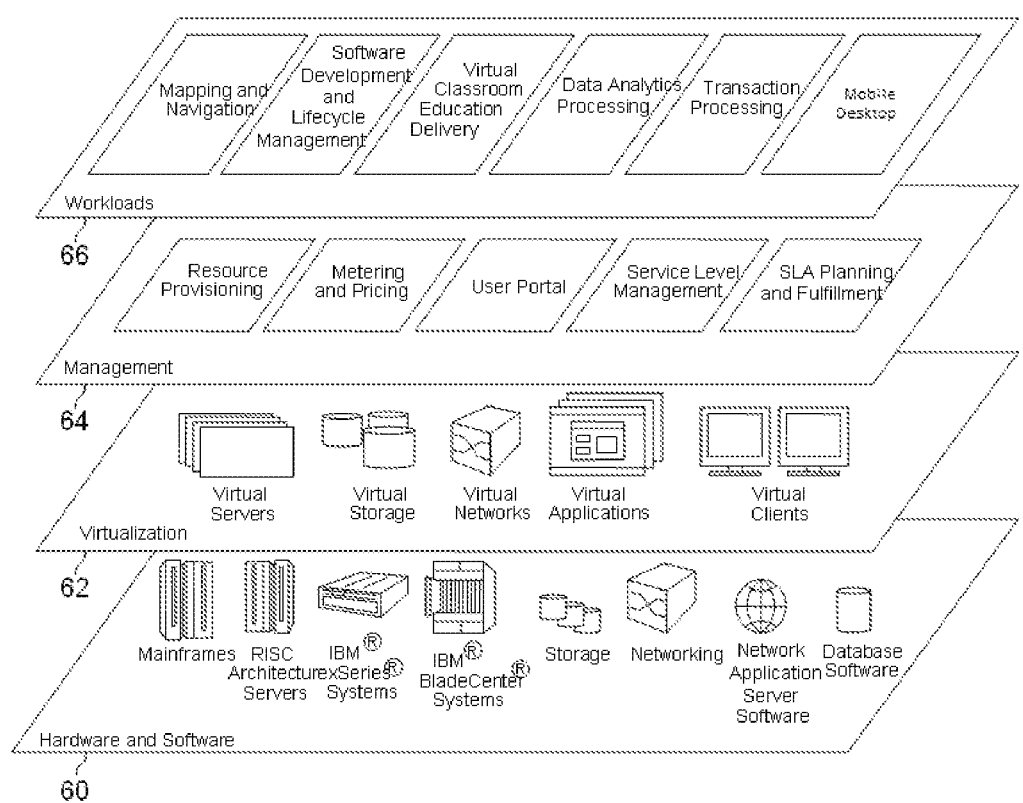
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network client, in one example IBM WebSphere® client; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA. Further shown in the management layer 64 is resource provisioning, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing and mobile desktop.

It is understood that all functions of embodiments of the present invention as described herein typically may be performed by the resource provisioning management layer 64. The resource provisioning management layer 64 can be tangibly implemented as modules of program code 42 of program/utility 40 of FIG. 1. However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment known now or later developed.

Figure 4:
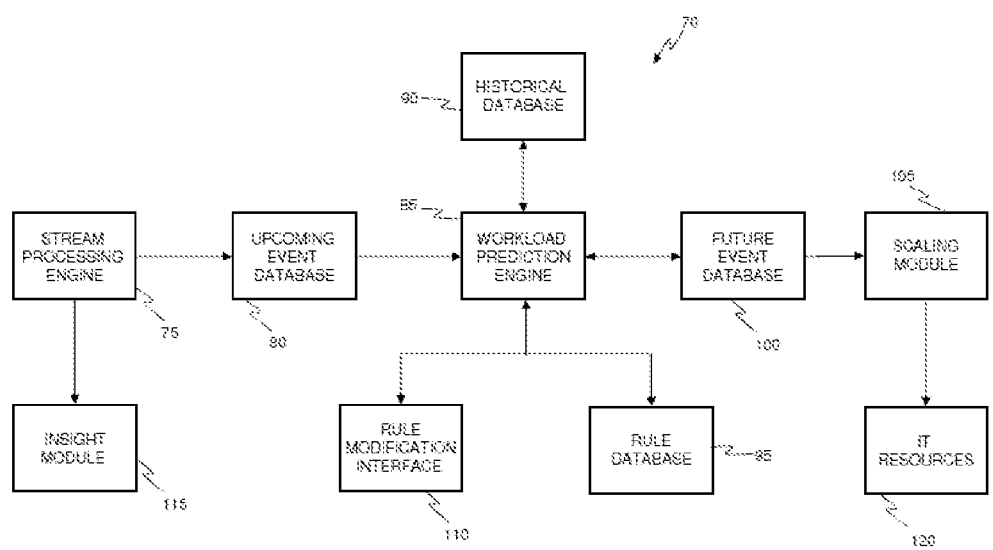
FIG. 4 depicts an illustrative environment in accordance with aspects of embodiments of the present invention.

FIG. 4 depicts an illustrative system 70 in accordance with embodiments of the present invention. The system 70 may be deployed for managing resources 120 on which an application is in operation. For example, the resources 120 may be information technology (IT) resources and may be part of a cloud. As shown in the example of FIG. 4, the system 70 includes a stream processing engine 75, an upcoming event database 80, a workload prediction engine 85, and a historical database 90. The stream processing engine 75 is adapted to receive information streams and process the information streams to identify upcoming events having an impact on the application. In the shown example of FIG. 4, the identified upcoming events are stored in the upcoming event database 80. The workload prediction engine 85 is operably coupled to the upcoming event database 80 and is configured to access the upcoming events stored therein.

The historical database 90 may be configured to store historical data of previous events processed by an application and a past scaling history of the application. The historical data may comprise a historical workload on the application corresponding to previous events and historical information corresponding to previous events. The term "workload" referred to herein is defined as number of transaction performed by the application per second. The historical information may comprise business information or other information relating to previous events. For example, if the application relates to online ticket sales, the business information may include number of tickets sold for the previous event.

According an embodiment of the present invention, the workload prediction engine 80 is configured to monitor the upcoming events stored at the upcoming event database 80 for predicting a workload on the application due to the upcoming event. According to an embodiment of the present invention, the workload prediction engine 85 is configured to predict the workload on the application due to the upcoming event using historical data stored at the historical database 90. The workload prediction engine 85 may use the historical data of a previous event having similarity with the upcoming event to predict the workload on the application. For example, the workload prediction engine 85 may be configured to identify the previous event having similarity with the upcoming event by comparing the upcoming event with one or more previous events stored into the historical database.

According to an embodiment of the present invention, the workload prediction engine 85 is configured to apply rules to predict the workload. Prediction of the workload by applying rules provides the advantage of changing the prediction based on the importance of the upcoming event. The rules may be pre-defined and provided to the workload prediction engine 85. For example, the rules may be defined using variables and the values of the variables may be changed responsive to the upcoming event. The rules may be defined by a rules designer and stored at a rule database 95 operably connected to the workload prediction engine 80. The workload prediction engine 80 may retrieve the rules from the rule database 90 for predicting the workload on the application due to the upcoming event identified.

According to one embodiment, the stream processing engine 75 may be further configured to determine a popularity score of the identified upcoming event. In one embodiment, the popularity score may be determined by analyzing the social media streams in the information stream to determine the popularity of the upcoming event. The popularity score of the upcoming event may be stored at the upcoming event database 80. The workload prediction engine 85 may be further configured to use the popularity score for predicting the workload. Thus, the workload predicted for an upcoming event having high popularity score may be higher than the workload predicted for an upcoming event having lower popularity score.

The workload predicted by the workload prediction engine 85 may be stored at a future event database 100. A scaling module 105 operably connected to the future event database 100 may be configured to retrieve the predicted workload for the upcoming event. The scaling module 105 may be configured to ascertain the number of resources required to process the predicted workload. According to one embodiment of the present invention, the scaling module 105 is configured to ascertain the number of resources 120 required to process the workload using past scaling history of the resources 120. The past scaling history comprises previous scaling information of the resources 120. The past scaling history of the resources 120 may be stored at the historical database 90 and the scaling module 105 is configured to retrieve the scaling history from the historical database 90. The scaling module 105 may also be configured to store the scaling information of the resources 120 corresponding to an event at the historical database 90. The scaling information stored at the historical database 90 may be retrieved in future by the scaling module 105 as past scaling history of the resources 120. For example, the past scaling history may be stored in the form of a look-up table comprising the workload of the past events and the number of resources 120 required to process the corresponding workload. According to an embodiment of the present invention, the scaling module 105 may also be configured to store a time duration of scaling up the resources 120 into the historical database 90. For example, the time duration of scaling up the resources 120 for an event can be provided to the historical database 90 and the historical database may be configured to store the same. The time duration may also be stored in the look-up table comprising the workload and the number of resources 120 required to process the workload.

According to an embodiment, the scaling module 105 may be configured to determine the time duration required to scale up resources 120 supporting the application to the number determined. According to an embodiment, the scaling module 105 may determine this using the past scaling history. According to another embodiment, the time duration of scaling one resource for the application may be provided to the scaling module 105 and the scaling module may determine the time duration required for scaling up the resources 120 to the determined number. The scaling module 105 may be configured to initialize the scaling of the resources 120 based on the time duration determined so that the resources 120 are scaled up to the determined number before the occurrence of the event. For example, if the application is currently being supported by four servers and it is required to scale up the resources 120 to six servers, the scaling module 105 may determine the time duration for scaling the resources 120 by two servers and initialize the scale accordingly so that six servers start supporting the application before the occurrence of the event. This provides the advantage of scaling the resources 120 to meet the workload before the occurrence of the event.

According to an embodiment of the present invention, the pre-defined rules may be modified in real time prior to the rule being live. Accordingly, the system 70 may comprise a rule modification interface 110 for enabling modification of the rules. For example, an analyst may modify one or more variables of the pre-defined rules via the rule modification interface 110. This provides the advantage of modifying the rules in real time based on the current insights corresponding to the application. According to an embodiment of the present invention, an insight module 115 may be operably connected to the stream processing engine 75 for providing insights corresponding to the application to the analyst. The analyst based on the current insights may modify the rule. This provides the advantage of optimizing the prediction of the workload.

According to an embodiment of the present invention, the rule may be verified by modeling the prediction of the workload by the workload prediction engine 85 using the rule. The workload prediction engine 85 may predict the workload using the rule and the historical data corresponding to the application. The historical data corresponding to the application may be retrieved from the historical database 90 and the rule may be processed using the historical data to predict the workload on the application. The predicted workload may be compared with an actual historical workload on the application to verify the prediction. Based on the verification, the rules may be modified. For example, it may be verified if the number of resources 120 can handle the predicted workload or if one or more of the resources 120 are idle at any point of time. This provides the advantage of verifying the rule so that resources 120 are not wasted and also that the resources 120 are capable of handling the predicted workload.

According to one embodiment, the stream processing engine 75 may be configured to receive one or more information streams corresponding to a web based information, a sensor data, an audio stream, a video stream, a radio audio stream, an organization internal data, and the like. The web based information may include social media, real time news streams, and the like. The video stream may include television data streams and/or closed circuit television data streams.

The functions of the stream processing engine 75, the workload prediction engine 85 and the scaling module 105 may be performed by the computer system 12 of FIG. 1. The upcoming event database 80, the historical database 90, rule database 95 and the future event database 100 may be implemented using the storage system 34 of FIG. 1.

Example:

The workload prediction engine 85 retrieves an upcoming event from the upcoming event database 80. The workload prediction engine 85 retrieves historical data of a previous event having similarity with the upcoming event from the historical database 90. The historical workload of the application is 800 transactions per second. The workload prediction engine retrieves a popularity score of the upcoming event. The popularity score of the upcoming event is 20 percent over past events. The workload prediction engine 85 predicts the workload on the application to be 960 transactions per second, 20 percent higher. The scaling module 105 determines that on average 200 transactions per second are processed by two servers. It scales the servers from two to ten before the occurrence of the event so that the predicted workload can be handled.

Figure 5:
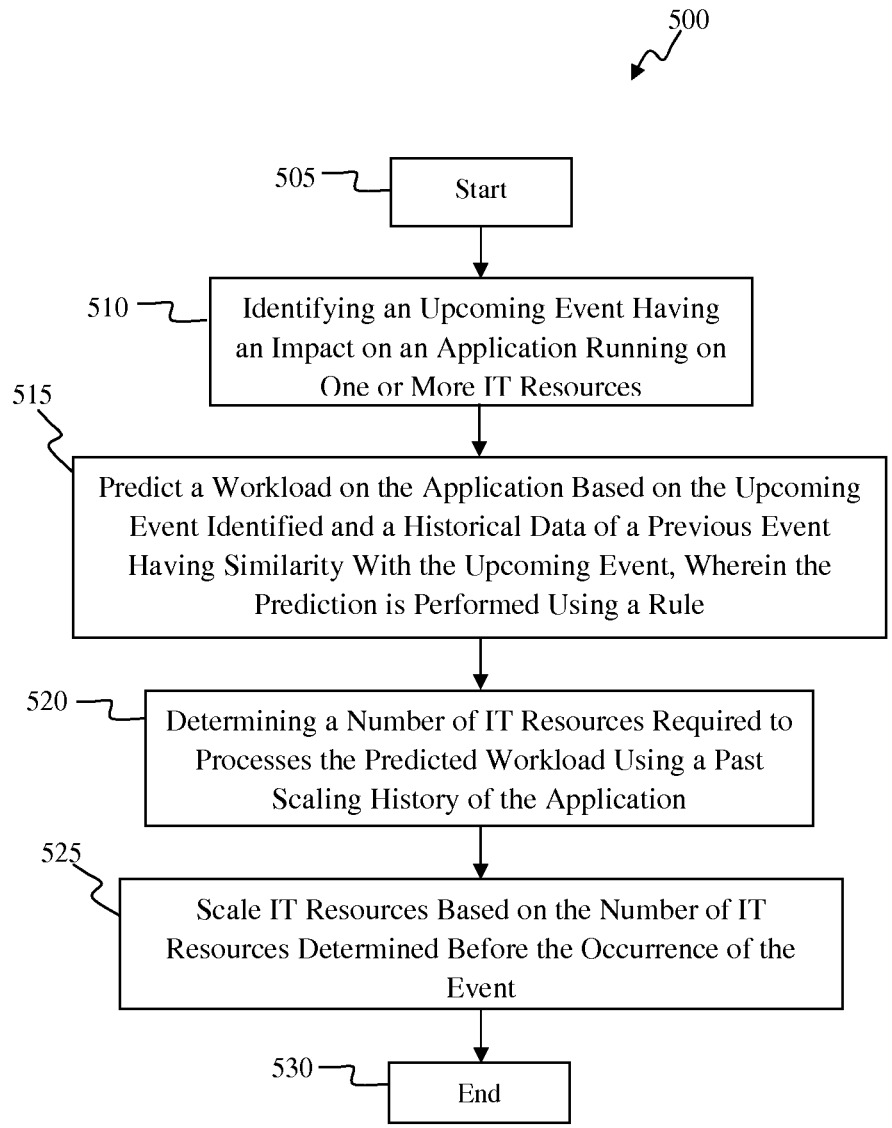
FIG. 5 shows an exemplary flow for performing aspects of embodiments of the present invention.

FIG. 5 depicts an exemplary flow for a process 500 in accordance with aspects of the present invention. In embodiments, the process 500 can be performed by the system 70 in FIG. 4.

At block 505, the process starts. At block 510, an upcoming event impacting an application operating on one or more resources (e.g., the resources 120 in FIG. 4) is identified by a stream processing engine (e.g., the stream processing engine 75 in FIG. 4). The stream processing engine may be configured to identify the upcoming event by processing one or more information streams from one or more sources. At block 515, a workload prediction engine (e.g., the workload prediction engine 85 in FIG. 4) predicts a workload on the application based on the upcoming event identified and a historical data of a previous event having similarity with the upcoming event, wherein the prediction is performed using a predefined rule. The historical data of the previous event having similarity with the upcoming event may be retrieved by the workload prediction engine from a historical database (e.g., the historical database 90 in FIG. 4). The predefined rule may be retrieved by the workload prediction engine from a rule database (e.g., the rule database 95 in FIG. 4). At block 520, a scaling module (e.g., the scaling module 105 in FIG. 4) ascertains a number of resources required to processes the predicted workload using a past scaling history of the application. The past scaling history of the application may be retrieved by the scaling module from the historical database. At block 525, the scaling module scales the resources based on the ascertained number of resources before the occurrence of the event. At block 530, the process ends.

The embodiments described herein enable in predicting the workload on an application due to an event and scale the resources based on the prediction. This provides the advantage of maintaining the quality of service (QoS) and keeping the cost low. The event can be identified from external information sources or information internal to an enterprise. The prediction of the workload using rules provides the advantage of changing the prediction based on the importance of the event. The scaling up of the resources can be initiated such that the resources are scaled up before the occurrence of the event so that the application is ready to handle the workload resulting from the event. For example, the resources can be part of a cloud and the resources of the cloud can be scaled up for meeting the workload of the applications running on the cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
    a memory having computer readable instructions; and
    a processor for executing the computer readable instruction, the instructions including:
    identifying an upcoming event impacting an application operating on one or more resources, the identifying including retrieving information about the upcoming event from a database;
    predicting a workload on the application based on the upcoming event identified, a popularity score of the upcoming event, and a historical data of a previous event having similarity with the upcoming event, wherein the prediction is performed using a predefined rule;
    comparing the predicted workload with an actual historical workload on the application;
    verifying the prediction based on the comparison;
    ascertaining a number of said resources required to process the predicted workload using a past scaling history of the application;
    determining a time duration for scaling said resources to the number of said resources ascertained; and
    scaling said resources based on the ascertained number of said resources before the occurrence of the event, wherein the scaling said resources is initialized at a time that proceeds the occurrence of the event by at least the time duration.

2. The system of claim 1, wherein the instructions further include:
    monitoring one or more information streams received from one or more sources for identifying the upcoming event.

3. The system of claim 1, wherein the instructions further include:
    computing the popularity score of the upcoming event based on contents of a social media stream.

4. The system of claim 3, wherein the information streams include the social media stream.

5. The system of claim 1, wherein the historical data comprises a historical workload on the application corresponding to the previous event.

6. The system of claim 1, wherein the historical data comprises historical information corresponding to the previous event.

7. The system of claim 1, wherein the information streams corresponds to a web based information, a sensor data, an audio stream, a video stream, or a radio audio stream.

8. The system of claim 1, wherein:
the information about the upcoming event is generated based on information streams from one or more sources that are processed by a stream processing engine; and
the information about the upcoming event is stored in the database by the stream processing engine.

9. The system of claim 8, wherein the information streams include at least one stream having information selected from the group consisting of web based information, sensor data, an audio stream, a video stream, and a radio audio stream.

10. A system comprising:
a memory having computer readable instructions; and
a processor for executing the computer readable instruction, the instructions including:
identifying an upcoming event impacting an application operating on one or more resources, the identifying based on an information source that is external to the system;
predicting a workload on the application based on the upcoming event identified, a popularity score of the upcoming event, and a historical data of a previous event having similarity with the upcoming event, wherein the prediction is performed using a predefined rule;
comparing the predicted workload with an actual historical workload on the application;
verifying the prediction based on the comparison;
ascertaining a number of said resources required to process the predicted workload using a past scaling history of the application;
determining a time duration for scaling said resources to the number of said resources ascertained; and
scaling said resources based on the ascertained number of said resources before the occurrence of the event, wherein the scaling said resources is initialized at a time that proceeds the occurrence of the event by at least the time duration.

* * * * *